(12) United States Patent
Propson et al.

(10) Patent No.: US 6,684,498 B1
(45) Date of Patent: Feb. 3, 2004

(54) CABLE MANAGEMENT SYSTEM

(75) Inventors: Curt D. Propson, Hamel, MN (US); Scott R. Limback, St. Paul, MN (US)

(73) Assignee: Plasmon IDE, Inc., Eden Prairie, MN (US)

( * ) Notice: Subject to any disclaimer, the term of this patent is extended or adjusted under 35 U.S.C. 154(b) by 0 days.

(21) Appl. No.: 09/544,836

(22) Filed: Apr. 6, 2000

(51) Int. Cl.$^7$ ................................................ H01R 43/00
(52) U.S. Cl. ...................... 29/857; 29/825; 242/230; 242/234; 242/410; 242/412; 242/417; 242/419.4; 242/615
(58) Field of Search .............................. 242/230, 234, 242/410, 412, 417, 419, 419.4, 615, 149, 325.2, 326, 337, 241; 29/825, 593

(56) References Cited

U.S. PATENT DOCUMENTS

| | | | |
|---|---|---|---|
| 2,921,787 A | * | 1/1960 | Cousino |
| 3,030,041 A | * | 4/1962 | Cousino |
| 3,679,147 A | * | 7/1972 | Kittredge |
| 3,722,988 A | * | 3/1973 | Neudecker |
| 3,778,137 A | * | 12/1973 | Castellano et al. |
| 4,722,494 A | | 2/1988 | Fairchild .................... 242/107 |
| 4,779,479 A | | 10/1988 | Abrams et al. ............... 74/501 |
| 5,596,556 A | | 1/1997 | Luffel et al. .................. 369/36 |
| 5,721,716 A | | 2/1998 | Luffel et al. .................. 369/36 |
| 5,975,450 A | | 11/1999 | Leger et al. ................ 242/337 |
| 5,999,042 A | | 12/1999 | Hemdal et al. ............. 327/554 |
| 6,019,323 A | | 2/2000 | Jette ............................ 248/49 |

FOREIGN PATENT DOCUMENTS

| | | |
|---|---|---|
| CA | 1215701 | 12/1986 |
| WO | WO-98/26485 | 6/1998 |

* cited by examiner

*Primary Examiner*—Carl J. Arbes
(74) *Attorney, Agent, or Firm*—Schwegman, Lundberg, Woessner & Kluth, P.A.

(57) ABSTRACT

A cable management system comprising a cable flex radius system having at least two opposing curved surfaces to control flex radius of a cable linking a stationary system to a dynamic system is disclosed. The cable management system also comprises a cable strain relief system comprising a cable clamp located on each of the at least two opposing curved surfaces. The system simultaneously provides position biasing of a driven rotating mechanism referenced to a fixed system as well as mechanism backlash control. The system insures consistent cable bend radius and slack management required to insure flex cable cycle life. In one embodiment, the cable management system is comprised of a torsion arm and a spool. In this embodiment, the torsion arm pivots during rotation of the spool. A spring connected to the torsion arm provides the requisite tension force to a cable that links the spool and the torsion arm. In this way, cable movement is controlled not only during operation of a moving mechanism, but also while the mechanism is at rest. Such control is particularly useful in devices which require precise movements, such as media storage devices.

29 Claims, 7 Drawing Sheets

CABLE MANAGEMENT SYSTEM

FIELD

The present invention relates generally to cable management systems and particularly to cable management in a stationary system linked to a dynamic system.

BACKGROUND

Interface cables are used to connect stationary systems to dynamic systems in many types of devices, such as in automated manufacturing devices, mass storage devices, and so forth. However, when a cable has excess slack or is otherwise uncontrolled, it may twist, flap or become entangled, causing the moving system to function improperly. Furthermore, cable life is shortened when its movements are uncontrolled, since it is flexing and bending in an inconsistent manner. For example, if the bend radius of the cable is too tight, wires within the cable can wear out or break. Also, since loose cables take up more room than managed cables, the device itself must be made larger to accommodate these cables. Partial control of cables, such as accumulating a cable in a separate chamber also does not solve the problem, as the cable is still subject to random movements that can include contacting an outer wall of the chamber. In addition to reducing precision operation of the dynamic system, such contact can also cause wearing of cable insulation.

In mass storage devices, for example, ribbon cables connect stationary electronics to electronics on moving assemblies, such as a pivot assembly and a lift assembly. Together, these assemblies are used to position a robotic device, i.e., a media transport assembly (MTA), to retrieve the desired media from storage. Uncontrolled slack in the ribbon cables, however, causes bending and flexing of the cables during operation. This flexing can cause the cables to catch on protrusions within the chassis, interfere with sensor operation, bend too tightly, wear out, and so forth. Furthermore, during pivoting of the pivot assembly, backlash can occur, i.e., movement or play in gear teeth alignment, which also reduces the resolution and repeatability in positioning of the MTA.

For the reasons stated above, and for other reasons stated below which will become apparent to those skilled in the art upon reading and understanding the present specification, there is a need in the art for providing improved cable management in a dynamic system linked to a stationary system.

SUMMARY

A cable management system comprising a cable flex radius system having at least two opposing curved surfaces to control flex radius of a cable linking a stationary system to a dynamic system is disclosed. The cable management system also comprises a cable strain relief system comprising a cable clamp located on each of the at least two opposing curved surfaces. The system simultaneously provides positional control of the cable and biased backlash of the gears in the dynamic system. The system insures consistent cable bend radius and slack management required to insure flex cable cycle life.

In one embodiment, the cable management system is comprised of a torsion arm and a spool. In this embodiment, the torsion arm pivots during rotation of the spool. A spring connected to the torsion arm provides the requisite tension force to a cable that links the spool and the torsion arm. In this way, cable movement is controlled not only during operation of a moving mechanism, but also while the mechanism is at rest. Such control is particularly useful in devices which require precise movements, such as media storage devices.

The components comprising the cable management system are simple and inexpensive, thus factory installation specifications are easy to maintain. As a result, an additional advantage of the present invention includes the ability to easily retrofit manufactured devices with the cable management system.

DESCRIPTION OF EMBODIMENTS

In the following detailed description of embodiments, reference is made to the accompanying drawings which form a part hereof, and in which are shown by way of illustration specific embodiments in which the invention may be practiced. In the drawings, like numerals describe substantially similar components throughout the several views. These embodiments are described in sufficient detail to enable those skilled in the art to practice the invention, and it is to be understood that other embodiments may be utilized and logical, structural, electrical, and other changes may be made without departing from the scope of the present invention.

Figure 1:
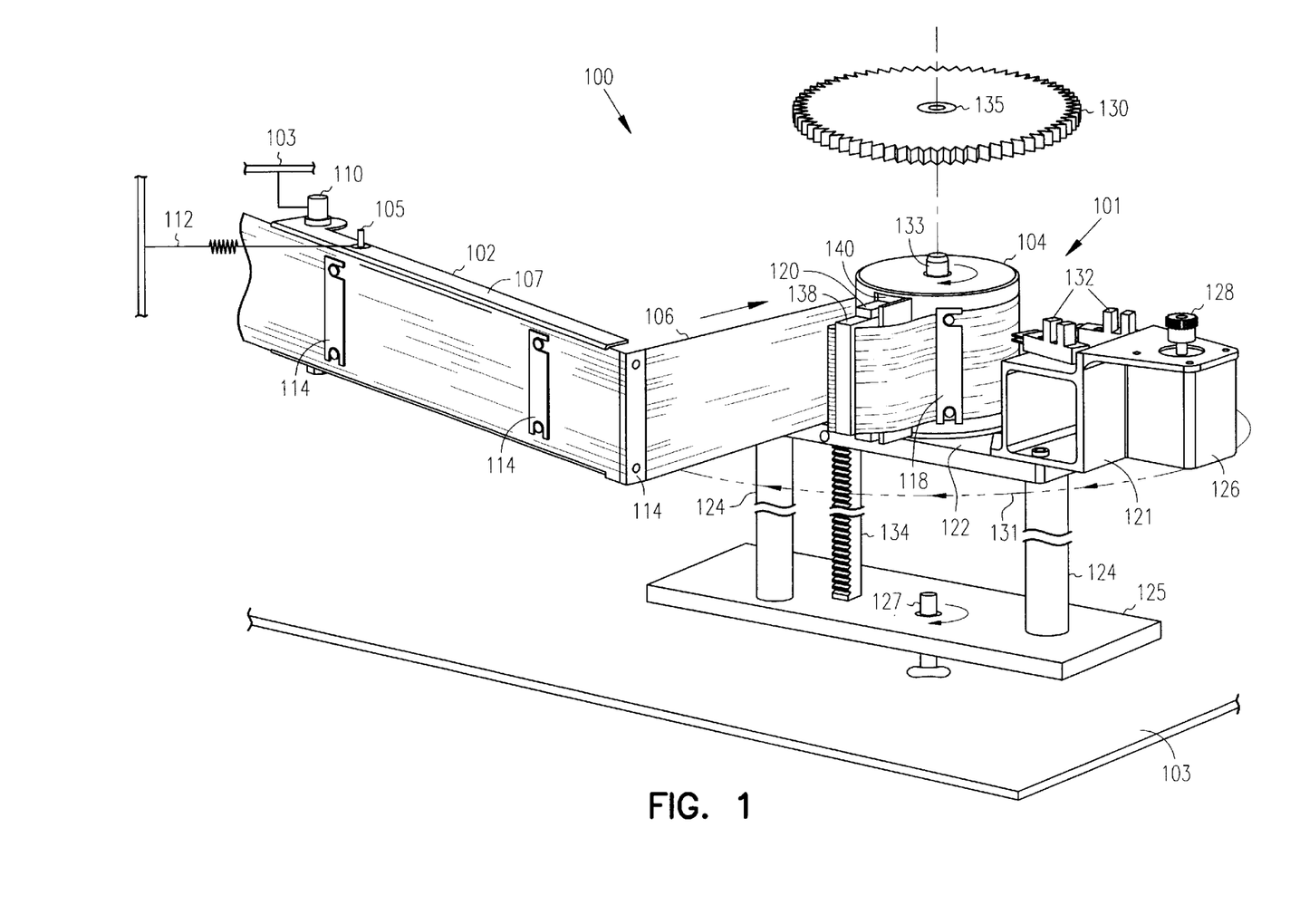
FIG. 1 is an exploded perspective view of a cable management system in a wound position in one embodiment of the present invention.

FIG. 1 shows one embodiment of a cable management system 100 for a pivot assembly 101. In this embodiment, the pivot assembly (hereinafter "rotating assembly") 101 rotates in a horizontal plane. The rotating assembly 101 (together with a lifting assembly) assists a media transport assembly (MTA) (commonly referred to as a "pick and place" mechanism or "picker") in moving media within a media storage device, such as a jukebox. (See FIGS. 6 and 7). In the embodiment shown in FIG. 1, it is the rotating assembly 101 on which the cable management system 100 is operational, although the invention is not so limited.

The cable management system 100 comprises a torsion arm 102 and a spool 104. The torsion arm 102 has a curved endpiece as shown in FIG. 1, and prevents twisting and bending of the cable 106. The torsion arm 102 also creates tension in the cable, thus providing positive tension control. A cable 106 in a "wound" position extends along the length of the torsion arm 102 and around the spool 104 as shown. The torsion arm 102 is connected to a chassis 103, such as the top of a jukebox, with pivotable connecting means 110. The torsion arm 102 is also connected to a different portion of the chassis 103, such as the side of a jukebox, with a spring 112. The other end of the spring 112 is connected to a knob 105 on the torsion arm 102, although the invention is not so limited. The spool 104 is in communication with and rotates about a fixed gear 130 that is affixed to the chassis 103 (shown in FIG. 7).

The torsion arm 102 shown in FIG. 1 has a straight portion and a curved portion, or endpiece, with flanges 107 located on the straight portion. The curvature provides a controlled radius for the cable 106. Attached to the torsion arm 102 are three torsion arm clamps 114, although the invention is not so limited. Any number of torsion arm clamps 114 can be used. In another embodiment, the torsion arm clamps 114 are integral with the torsion arm 102, and are not manufactured as separate components. All of the torsion arm clamps 114 help to secure the cable 106 to the torsion arm 102. The torsion arm clamp 114 located on the curved portion, however, also serves to provide strain relief for the cable 106. The torsion arm 102 pivots about the vertical axis of the pivoting means 110 as the cable 106 moves. Resistance to pivoting, i.e, tension, is provided by the spring 112.

The spool 104 has a spool clamp 118 to secure the cable 106 in place and to provide additional strain relief for the cable 106. In another embodiment, the spool clamp 118 is integral with the spool 104. In addition to the curved endpiece of the torsion bar 102, the spool 104 also serves to provide a controlled radius for the cable 106. Thus, the torsion arm 102 and spool 104 of the present cable management system 100 are together providing a positively controlled flex radius system, which provides many advantages, including helping to extend cable life.

Media storage devices, commonly referred to as "jukeboxes," are well-known in the art and will not be discussed in detail herein. Media storage devices include not only "bookshelf" type devices that operate in the x-y directions, but also devices such as those shown herein, that operate in the y-θ directions, i.e., vertically and rotationally. Those that operate in the y-θ directions typically have a lifting assembly for operating in the y direction and a pivot assembly for operating in the θ direction. Again, in the embodiment shown in FIG. 1, the pivot assembly is a rotating assembly 101 that rotates in a horizontal plane about a fixed center point or pivot. The lifting assembly is not shown in FIG. 1, although it is designed to move along a vertical gear rack 134 shown in FIG. 1. The rotating assembly 101 contains an upper plate 122 and lower plate 125 (sometimes referred to as a "spinner plates") with two support columns 124 in between that provide support for the upper plate 122. The entire rotating assembly 101 rotates together about an upper pivot 133 and a lower pivot 127. The upper pivot 133 is any suitable type of shaft, such as the "knob" shown in FIG. 1, that engages a bearing 135 in the fixed gear 130. The lower pivot 127 is any suitable type of shaft that engages a bearing fixed to the chassis 103. The upper plate 122 provides a base for a circuit board 120, motor mount 121, rotating motor 126, pinion gear 128 and sensors 132. The rotating motor 126 drives the pinion gear 128 around the circumference of the fixed gear 130 in a substantially circular path 131 as shown. Sensors 132 attached to the motor 126 are used to properly position the rotating assembly 101 and therefore the MTA.

The spool 104 is designed to fit over the top of the circuit board 120 so that a connector 138 located at the end of the cable 106 can be secured to the circuit board 120. The spool 104 includes a slot 140 through which the circuit board 120 protrudes. The spool clamp 118 described above also serves to prevent excess force from being placed on the circuit board 120 during operation.

Any type of flexible cable connected between two members, wherein the distance between the members is variable, can benefit from the cable management system 100 of the present invention. Although the invention is described in terms of a ribbon cable, a cable of any shape, such as a round or rectangular or irregularly-shaped cable can also be used. The cable 106 can be any suitable length and width. In one embodiment, the cable 106 is up to about 1.5 meters (about five (5) feet) in length and up to about 4.25 cm (about 1.7 in) in width. In another embodiment, the cable 106 is greater than 1.5 meters in length and eight (8) cm in width. In a particular embodiment, the cable 106 is a ribbon cable that is between about six (6) and eight (8) cm (about 2.5 to three (3) in) in width and between about 1.2 to 1.5 meters (about four (4) and five (5) ft) in length, with the last 0.46 m (1.5 ft) connected to and controlled by the cable management system 100.

The cable management system 100 of the present invention precisely controls and guides cable movement even at high speeds, keeping the length of cable between members in a taut condition, thus eliminating random movements of the cable 106. In applications where cable movement is extremely rapid, such as in jukeboxes, where between about 100 to 500 swaps per hour take place, random movement of the cable 106 can be particularly disrupting. ("Swaps" refer to moving a piece of media from one location to another). In a particular embodiment, about 400 to 450 swaps per hour is occurring. In such high speed applications, it is possible for the rotating assembly 101 to be moving up to about 100 degrees per second (deg/sec), when there is no acceleration. For a spool 104 having a radius of about 3.8 cm (1.5 in), this is up to about 6.6 cm/sec (about 2.6 in/sec) at the outer edge of the spool 104. In other embodiments, the cable 106 may be moving even faster. In other embodiments, the rotating assembly 101 can be accelerating up to about 270 deg/sec$^2$. If the cable 106 is allowed to flex and bend in a random manner, particularly at such high speeds, it is possible that the cable 106 can contact a wall or system component, leading to reduced system performance or even system failure, as well as wearing of cable insulation.

Figure 2:
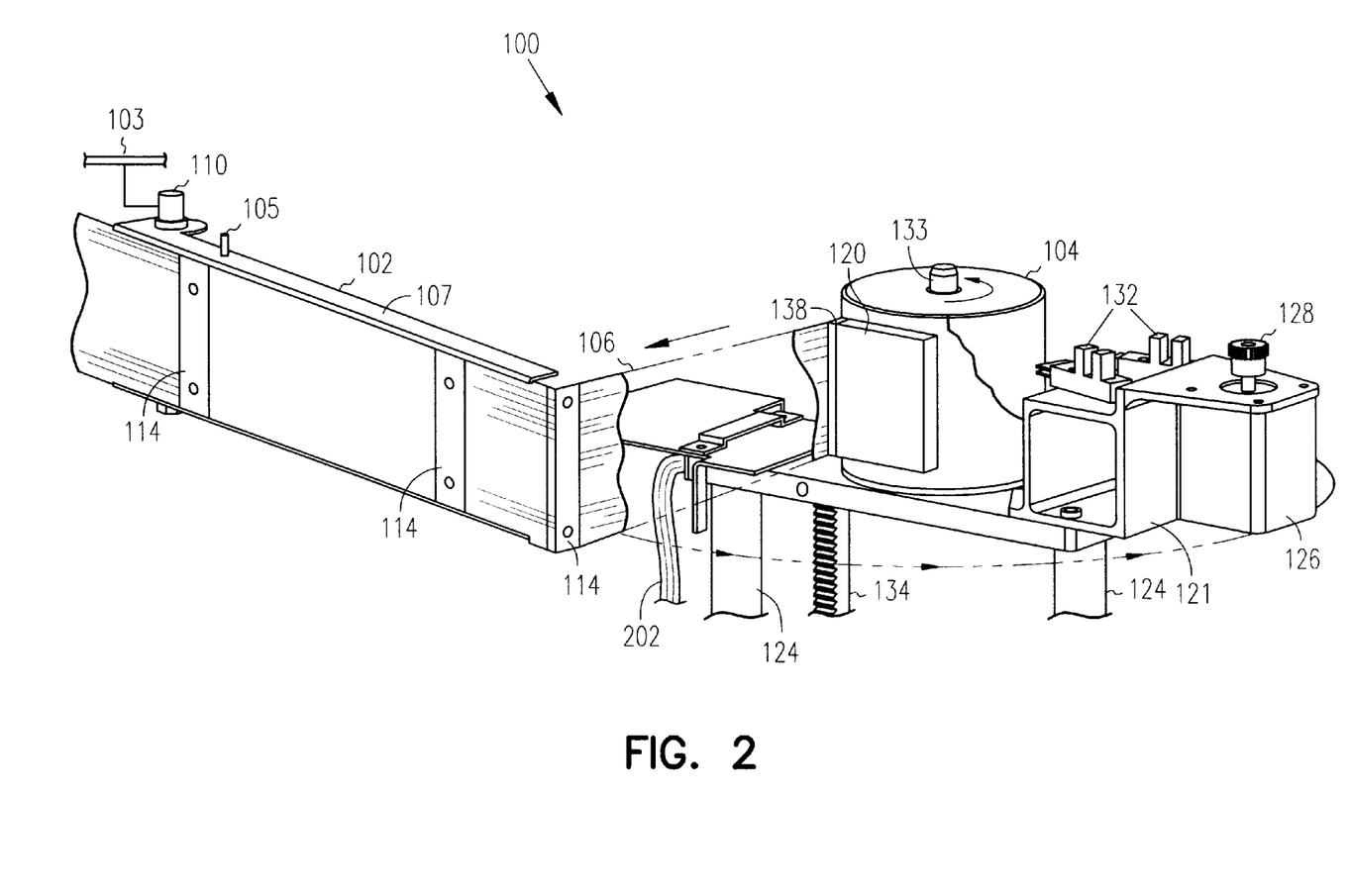
FIG. 2 is a perspective view of a cable management system in an unwound position in one embodiment of the present invention.

As the rotating assembly 101, and hence the upper plate 122, rotates in either direction around the path 131, the cable 106 winds or unwinds around the spool 104. In one embodiment, the upper plate 122 can rotate up to 180 degrees. In another embodiment, the upper plate 122 is rotatable up to 360 degrees. This movement of the upper plate 122 causes the torsion arm 102 to pivot towards or away from the spool 104. In FIG. 2, the movement of the upper plate 122 has caused the spool 104 to rotate about 270 degrees in the opposite direction as compared with FIG. 1, such that the cable 106 is now in a "mostly" unwound position. Furthermore, the torsion arm 102 has now moved in a direction away from the spool 104. Rotation of the spool (104) 360 degrees from the position shown in FIG. 1 would result in the cable 106 being in a completely "unwound" position with respect to the spool 104.

The actual amount of movement of the torsion arm 102 during rotation of the spool 104 is dependent not only on the amount of spool rotation, but also on other factors such as spool geometry, torsion arm length, and so forth. The cable 106 is necessarily adjusted between these two points during assembly so that there is no slack. Depending on the application, the amount of cable 106 in between these two points can vary from as little as about eight (8) cm (about three (3) in) up to about 30 cm (about 12 in) or more. Furthermore, differences in assembly from one unit to another for a particular type of device can also cause variations in the amount of cable 106 between the two clamps. Such variations can also affect the "starting angle" of the torsion arm 102, i.e., if less than the required amount of cable 106 is used, the torsion arm 102 may be pulled slightly towards the spool 104 even when the cable 106 is in a completely unwound position. In one embodiment, there is about 15 cm (about six (6) in) of cable 106 between the two clamps. In such an embodiment, the torsion arm 102 moves about 37 degrees when a 7.6 cm (three (3) in) diameter spool 102 is rotated about 330 degrees, about 20 degrees when the same spool 102 is rotated about 180 degrees, and so forth.

As noted above, the torsion arm 102 creates a tension force in the cable 106. Any suitable amount of tension force can be applied as long as cable control is maintained. Testing can be performed to determine a minimum tension force required to achieve cable control in a particular application. Maximum tension biasing forces are dependent on several factors, including, but not limited to, the design of the torsion arm 102 and spool 104, the means for connecting the torsion arm 102 to the chassis 103, the means for connecting the spool 104 to the upper plate 122, and so forth. The type of cable 106 also limits the maximum amount of biasing force that can be applied. However, by using the cable 106 itself to provide positive tension control in the present invention rather than a separate "flex" strap, the cable 106 is not subjected to abrasion or chaffing from contact with a separate strap, which further helps to prolong cable life.

The tension force can be created by any suitable means, such as with a torsion spring, wind-up spring or a dead weight on a cable hung over a pulley, and so forth. In the embodiments shown herein, the tension force of the torsion arm 102 is created with a spring 112, such as an extension spring. The spring 112 can be of any suitable size and placed in any suitable location, as long as it exerts a substantially constant force over its range of travel. Otherwise, the torque applied by the cable 106 to the gears of the rotating assembly 101 can vary, depending on whether the rotating assembly 101 is rotating clockwise or counterclockwise, causing accelerated wearing of the gear teeth. Such variable torque can further cause problems for the electronics driving the rotating motor 126. Additionally, the biasing force of the cable 106 would not be constant if the torque is not constant.

In an alternative embodiment, the spring 112 is a coiled torsion spring. In one embodiment, the spring 112 is applying a force of about nine (9) Newtons (N) (about two (2) $lb_f$) or less. In another embodiment, the spring 112 is an extension spring applying a force of between about 5.6 N to 7.8 N (about 1.25 to 1.75 $lb_f$) to a ribbon cable having 68 conductors. In yet another embodiment, the spring 112 is applying a force greater than about nine (9) N. In such an embodiment, multiple cables may be controlled with multiple torsion arms 102 and spools 104, with the spools 104 stacked on top of each other and the torsion arms 102 also in alignment or on alternating sides of the chassis.

An additional feature of the present invention is that it serves to control or bias the backlash of the meshing gears, e.g., fixed gear 130 and pinion gear 128, even when the mechanism is at rest. The amount of "play" between mating teeth depends on the manufacturing of the gear teeth, but in most instances is between about 0.005 and 0.04 cm (0.002 and 0.016 in). However, with the cable management system 100 of the present invention, this play is controlled by biasing it to one side. Controlling the bias in this manner improves position repeatability and resolution of the MTA, because it no longer "feels" this play in the gear mesh when it stops to pick a media.

Figure 3:
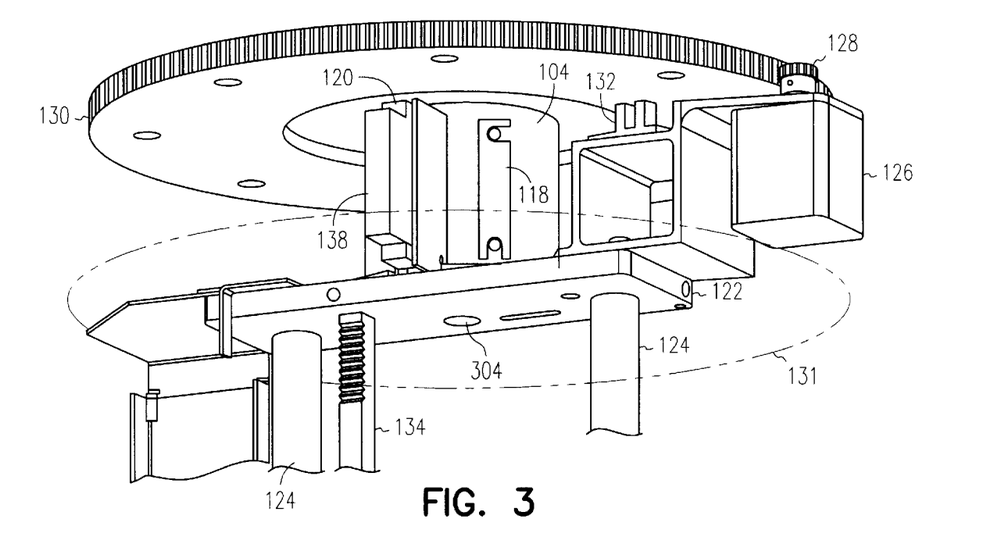
FIG. 3 is a perspective view of a portion of the cable management system shown in FIG. 1 connected to a fixed gear in one embodiment of the present invention.

FIG. 3 shows the fixed gear 130 in place on top of the spool 104. The cable is not present in this embodiment. The knob 133 shown in FIG. 2 extends into the bearing 135 in the fixed gear 130, thus providing the pivot point about which the rotating assembly 101 rotates, as described above. Tabs (not shown) from the circuit board 120 extend into upper plate mating holes 304 to help secure the circuit board 120 in place.

Figure 4:
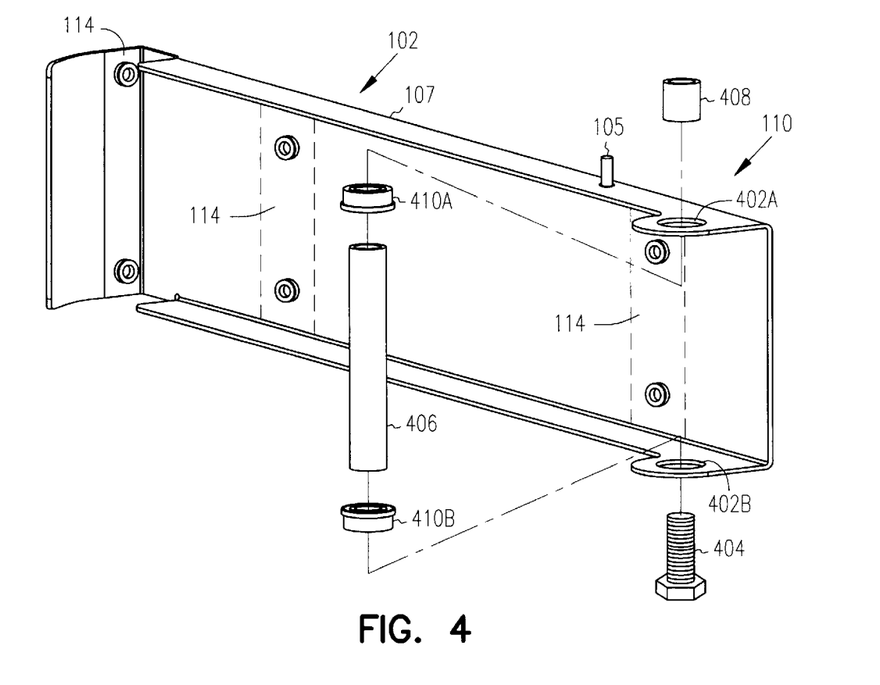
FIG. 4 is an exploded perspective view of a torsion arm for the cable management system in one embodiment of the present invention.

FIG. 4 shows one embodiment of the torsion arm 102. The torsion arm 102 can be made from any suitable material, such as wire, steel, plastics, and so forth. The size and geometry of the torsion arm 102 is dependent on the particular application, but should generally be at least about the width of the cable 106 being controlled. Length is also dependent on the particular application. Typically, the torsion arm 102 should be long enough to provide adequate control for the cable 106. Generally, the longer the torsion arm 102, the less it pivots. In one embodiment, the torsion arm 102 is about 25 to 35 cm (about 9.8 in to 14 in) in length. In a particular embodiment, the torsion arm 102 is about 30.5 cm (about 12 in) in length. The shape of the torsion arm 102 can vary as long as minimum control is provided. Specifically, the torsion arm 102 should have a minimum radius around which the cable 102 can bend.

The radius of the end piece needs to be large enough to prevent excessive bending of the cable 106. The precise radius needed can be determined using cable radius flex data provided by a cable manufacturer, but is generally greater than the minimum radius flex of the cable. In one embodiment, the torsion arm 102 is a spool such that cable management is achieved with a spool to spool system. This embodiment is particularly useful in applications having tight space limitations. In another embodiment, the curved end piece shown in FIGS. 1 through 3 is replaced with a spool. In one embodiment, the end piece is a curved portion about 0.6 cm (about 0.25) in to about ten (10) (about four (4) in) or more in length with a curve of between about 45 and 60 degrees. In another embodiment, the end piece is a spool having a diameter of between about 2.5 and 7.6 cm (about one (1) in and three (3) in). In a particular embodiment, the torsion arm 102 is about 6.4 cm (about 2.5 in) wide, about 30.5 cm (about 12 in) in length with a curved end piece about 1.3 cm (about 0.5 in) long, with a curvature of about 45 degrees. (A similarly sized circular end piece would have a diameter of about 6.4 cm).

The torsion arm 102 further comprises two lips or flanges 107 along the top and bottom edges for added strength. In this way, the torsion arm 102 does not bend or flex during operation and will not permanently deform. The torsion arm clamps 114 can be made from any suitable material, such as sheet metal with two suitably placed holes through which self-contained pins can go through.

The torsion arm 102 further has openings 402A and 402B through which the pivotable connecting means 110 is placed. The pivotable connecting means 110 is comprised of any suitable shaft or pin that allows the torsion arm 102 to pivot. In the embodiment shown in FIG. 4, the pivotable connecting means 110 is comprised of a pivot bolt 404, pivot nut 406, pivot shaft 408 through which the pivot bolt 404 is inserted, and two bearings 410A and 410B. The pivot bolt 404 is threaded into a fixed nut in the chassis (not shown) after exiting the upper opening 402A in the torsion arm 102.

Figure 5:
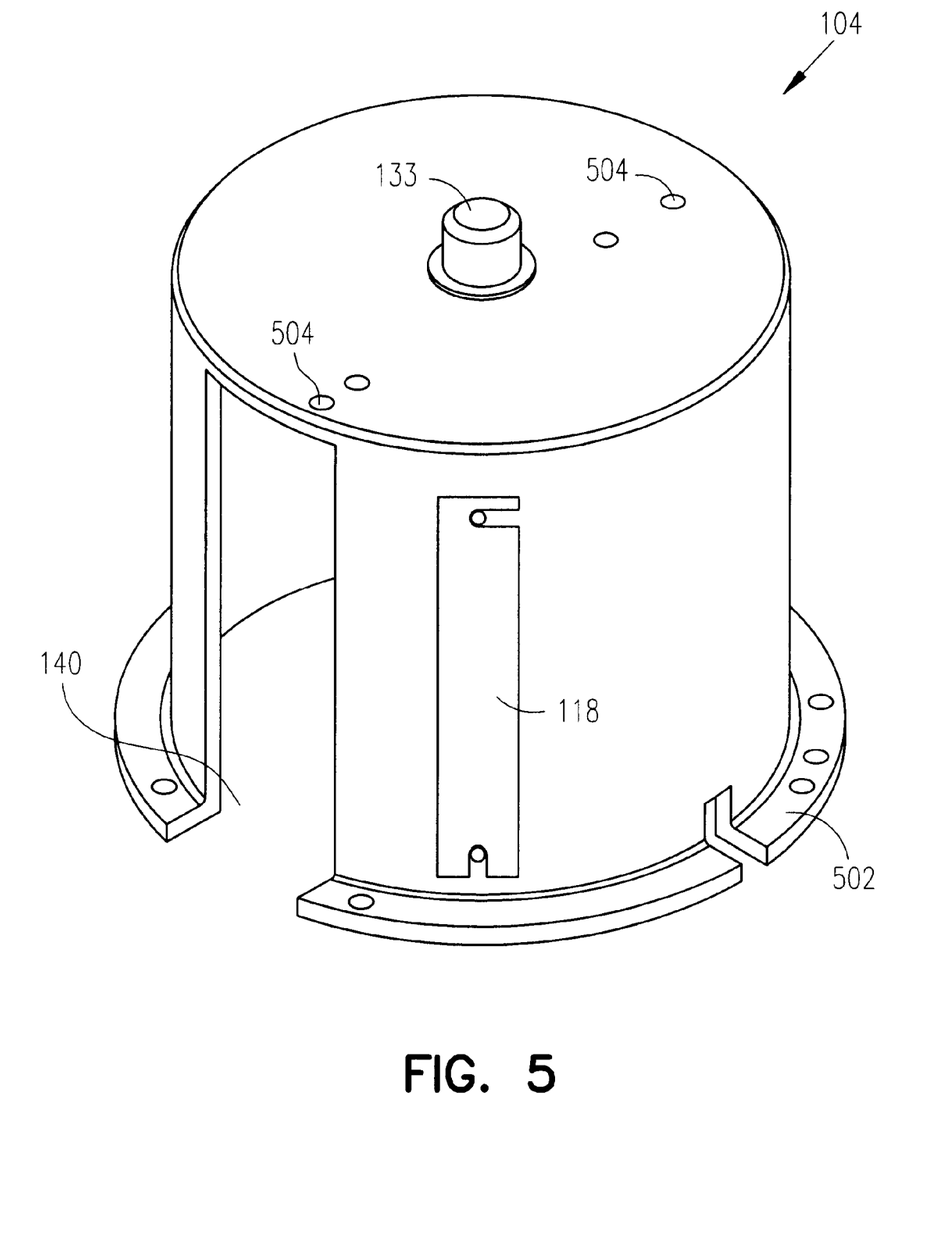
FIG. 5 is a perspective view of a spool for the cable management system in one embodiment of the present invention.

FIG. 5 shows one embodiment of the spool 104. In this embodiment, the spool has a rim 502 having holes through which screws are placed to secure it to the upper plate 122 (shown in FIGS. 1–3). Spool mating holes 504 on top of the spool 104 receive tabs from the circuit board 120 to secure the circuit board to the spool 104. These are similar to the upper plate mating holes 304 shown in FIG. 3, which receive tabs from the bottom of the circuit board 120. (See FIG. 3)

The spool 104 can be made from any suitable material. In one embodiment, the spool 104 is made from any type of smooth material having minimal friction. In another embodiment, the spool 104 is made from sheet metal or any type of plastic, including but not limited to acetal plastic, polypropylene, and so forth. The spool 104 can be any suitable size as long as it is greater than the minimum bend radius of the cable 106 and is sized appropriately in relation to the curved endpiece on the torsion arm 102. Generally, the smaller the spool 104 (and curvature on the end piece 102), the less the torsion arm 102 moves, reducing the chances of the torsion arm 102 touching other components. This is of particular advantage in applications where size is an important consideration, such as small devices containing numerous components.

Figure 6:
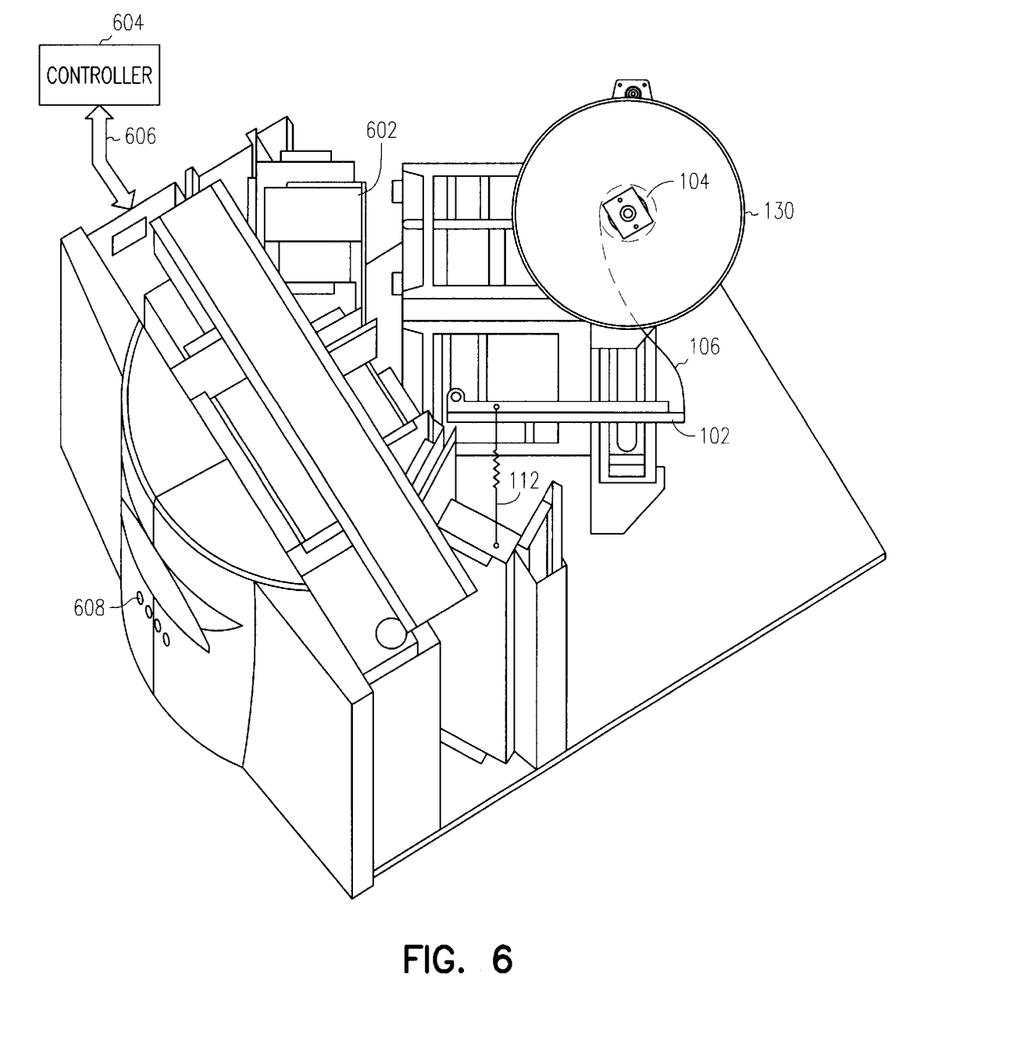
FIG. 6 is a cut-away perspective view of a cable management system in place in a media storage device in one embodiment of the present invention.
Figure 7:
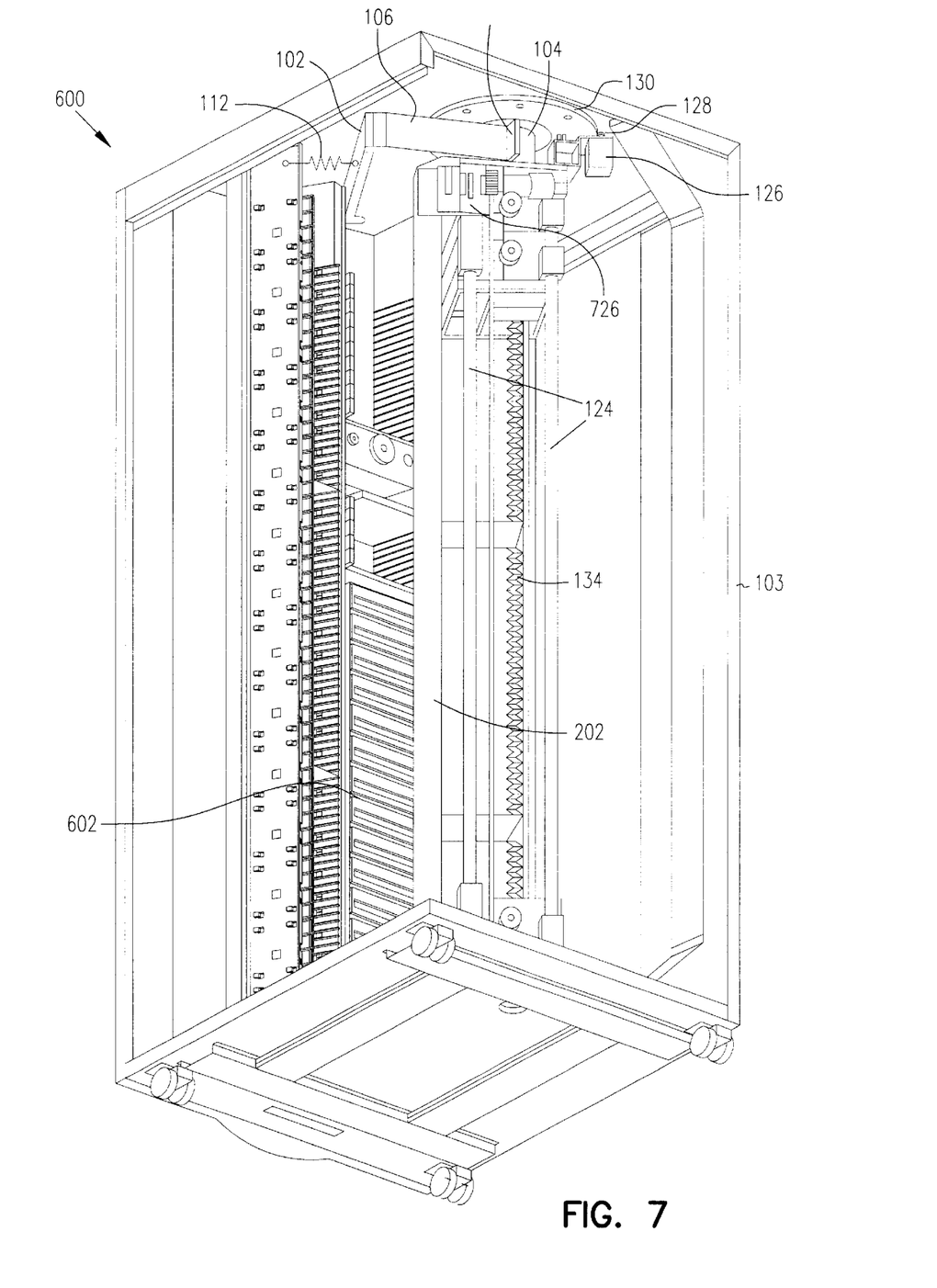
FIG. 7 is an alternative perspective view of a cable management system in place in a media storage device in one embodiment of the present invention.

FIG. 6 shows the torsion arm 102 and spool 104 of the present invention in use in a jukebox 600. Media storage racks 602 are also shown in this embodiment. Activation of the jukebox 600 can be accomplished with a suitable controller 604 and databus 606. Additionally, the jukebox 600 in this embodiment has external buttons 608 that can be pressed to perform certain operations. FIG. 7 is another perspective of the jukebox 600. In this embodiment, a lifting motor 726 and associated components can be seen. In one embodiment, each of the motors (126 and 726) further comprise a processor and a memory, the memory capable of storing a plurality of operating commands for the motor, and the processor capable of executing the stored commands to operate the motors.

Figure 8:
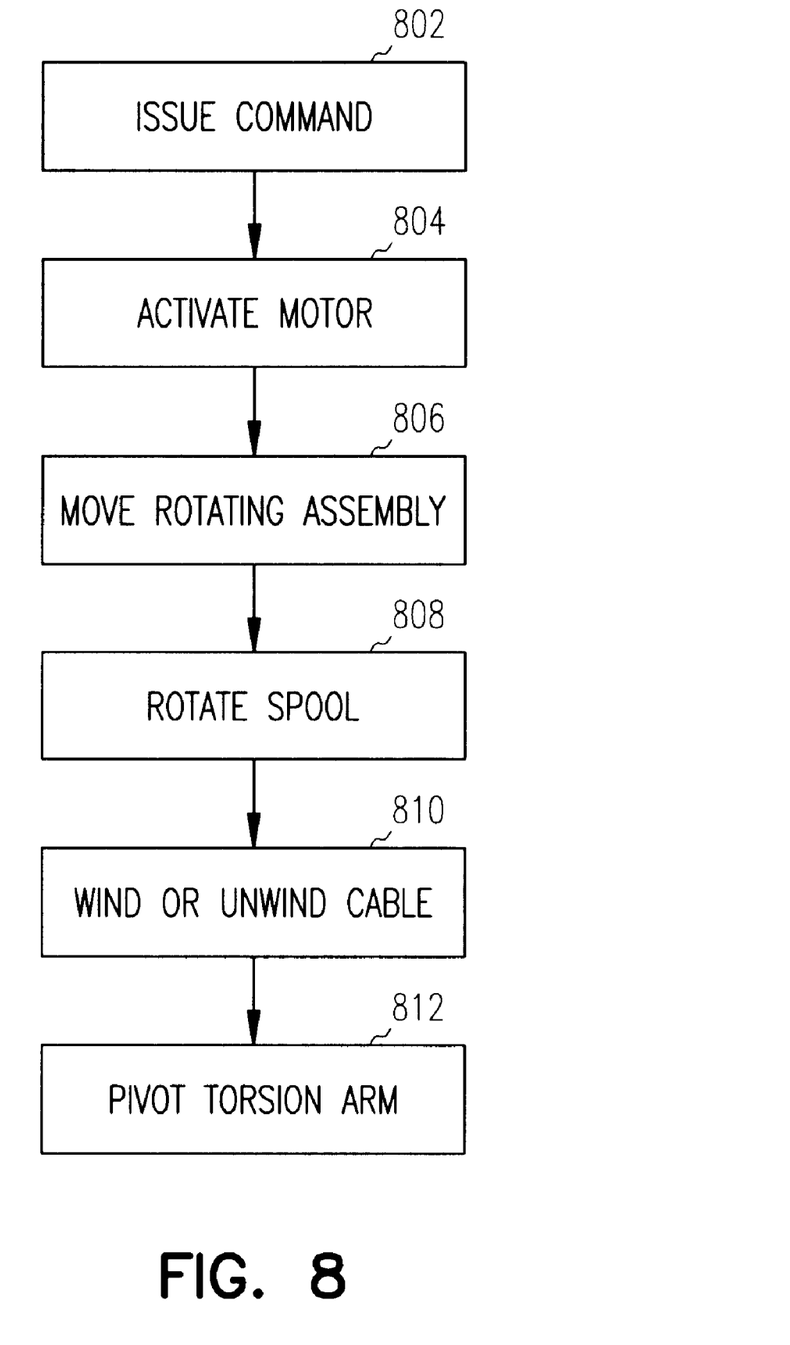
FIG. 8 is a flow chart diagram of a method embodiment of the present invention.

In operation, as shown in FIG. 8, a command is issued 802 from a controller to a device to perform a specific function, such as retrieve a piece of media from storage and place it in a drive, i.e., place information on-line. The media may be in any number of formats, such as optical disk, tape cartridge, floppy disk, CD, DVD, and so forth. The system has the appropriate motors and electronics known in the art to perform the requested function. In response, a motor is activated 804, causing an MTA to move into alignment with storage walls. This alignment is accomplished through movement of the rotating assembly (and can also include vertical assembly movement in addition to or instead of rotating assembly movement). Movement of the rotating assembly causes a spool to rotate 806 in the bearing. As the spool rotates, cable winds or unwinds 808 around the spool. The movement of the cable causes a torsion arm onto which the cable is attached to pivot 810 towards or away from the spool.

With the cable management system of the present invention it is now possible to continuously track cable location in systems in which the cable interfaces between a stationary system and a dynamic system. As such, the cable management system provides a single solution to multiple design issues. The system provides interface cable control with reliable and consistent flex radius to insure system reliability and improve cable life. The biasing characteristics of the system also improve mechanism positioning repeatability without the use of expensive components. The system has the added advantage of minimizing internal space requirements in a device due to positive tension control of cable at all times. This sustained force in conjunction with the strain reliefs provided may also reduce overall system failures caused by sudden jolts caused by any type of unexpected or unintended external force. The system also has application in zero gravity, low gravity, varying g-force or varying axis environments.

Linear mechanism applications, i.e., vertical or horizontal applications, can also benefit from the positive tension control provided by the interface cable in this system. Motion dampening devices can also be added to enhance the effectiveness of the control features described above. However, the use of the torsion arm in the present invention likely already reduces "settling" time of the MTA, i.e., the vibrations that occurs when the MTA stops abruptly to pick media. Specific tests can be designed to determine the dampening effects of the cable management system that occur presently, without added motion dampening devices.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A cable management system comprising:
 a cable flex radius system having at least two opposing curved surfaces to control flex radius of a cable, wherein a first curved surface is connected to a pivot assembly and a second opposing curved surface is connected to a fixed object, further wherein the fixed object is connected to stationary electronics and the cable links the stationary electronics to electronics located on the pivot assembly; and
 a cable strain relief system connected to the cable flex radius system, the cable strain relief system comprising a first cable clamp located on the first curved surface and a second cable clamp located on the second opposing curved surface, wherein the first cable clamp also secures the cable to the first curved surface and the second cable clamp also secures the cable to the opposing second curved surface.

2. The cable management system of claim 1 wherein the stationary electronics comprise an electronic controller.

3. The cable management system of claim 1 wherein the second opposing curved surface is connected to the chassis with a pivot pin.

4. The cable management system of claim 3 wherein the first curved surface can rotate up to 360 degrees and the second opposing curved surface pivots towards or away from the first curved surface during cable movement.

5. The cable management system of claim 4 wherein the pivot assembly rotates in a horizontal plane.

6. The cable management system of claim 5 wherein a media transport assembly in communication with the pivot assembly can be repeatedly positioned.

7. The cable management system of claim 1 wherein the fixed object is a chassis.

8. The cable management system of claim 1 wherein the second opposing curved surface is connected to the chassis with a connecting means adapted to allow the second opposing curved surface to rotate up to 360 degrees.

9. An apparatus for managing a cable comprising:

a pivotable torsion arm adapted to control a cable, the pivotable torsion arm connected to a fixed object; and a spool linked to the torsion arm with the cable, wherein the torsion arm pivots during rotation of the spool.

10. The apparatus of claim 9 wherein the cable is connected to a stationary electronic controller on one end, the stationary electronic controller connected to the pivotable torsion arm, and electronics on an opposing end, the electronics connected to the spool.

11. The apparatus of claim 10 wherein the pivot assembly is movable in the y-θ direction.

12. The apparatus of claim 9 in the torsion arm has a straight portion and a curved portion.

13. The apparatus of claim 12 further comprising:

pivoting means for pivoting the torsion arm in reference to the fixed object;

a spring connected to the straight portion of the torsion arm on one end and to the fixed object on the other end, wherein the spring provides a tension force to the cable by providing pivoting resistance to the torsion arm; and a clamp connected to the curved portion of the torsion arm to provide strain relief to the cable, wherein the clamp also secures the cable to the torsion arm.

14. The apparatus of claim 13 wherein the spring provides about 2.2 to 11 Newtons of tension force to the cable.

15. The apparatus of claim 13 wherein the pivoting means is a pivot bolt.

16. A method for controlling cable movement comprising:

providing a cable flex radius system having first and second opposing curved surfaces to control flex radius of a cable, wherein a first curved surface is connected to a pivot assembly and a second opposing curved surface is connected to a fixed object, further wherein the fixed object is connected to stationary electronics and the cable links the stationary electronics to electronics located on the pivot assembly; and providing a cable strain relief system for connection with the cable flex radius system, the cable strain relief system comprising a first cable clamp located on the first curved surface and a second cable clamp located on the second opposing curved surface wherein the first cable clamp also secures the cable to the first curved surface and the second cable clamp also secures the cable to the opposing second curved surface.

17. The method of claim 16 further comprising:

rotating the first curved surface up to 360 degrees;

pivoting the second opposing curved surface in reference to the fixed object; and providing tension in the cable with a spring connected to the second opposing curved surface on one end and the fixed object on the other end.

18. The method of claim 17 wherein the first curved surface is a spool and the second opposing curved surface is a torsion arm having a straight portion and a curved portion.

19. The method of claim 18 wherein the stationary comprises an electronic controller and the pivot assembly further comprises a plate located under the spool.

20. The method of claim 19 further comprising:

issuing a command to a jukebox to retrieve a piece of media in a storage wall;

moving a media transfer assembly in communication with the pivot assembly into alignment with the piece of media as the spool on the pivot assembly rotates; and winding or unwinding the cable around the spool as the torsion arm pivots.

21. The method of claim 20 further comprising repeatedly positioning a media transport assembly in communication with the pivot assembly.

22. The method of claim 17 further comprising consistently biasing the cable during cable movement.

23. A jukebox comprising a chassis;

a pivot assembly connected to the chassis;

a cable management system linking the chassis and the pivot assembly.

24. The jukebox of claim 23 further wherein the cable management system is comprised of a torsion arm and a spool.

25. A pivot assembly comprising:

a spool covering a circuit board, the spool having a slot through which the circuit board protrudes; and a cable clamp on the spool to secure a cable wherein strain on the circuit board is minimized.

26. The pivot assembly of claim 25 wherein the pivot assembly further comprises a plate located under the spool, further wherein the circuit board is connected to the plate and the cable.

27. The pivot assembly of claim 26 wherein the pivot assembly rotates in a horizontal plane.

28. A cable management system comprising:

a cable flex radius system having at least two opposing curved surfaces to control flex radius of a cable, wherein a first curved surface is connected to a pivot assembly and a second opposing curved surface is connected to a fixed object, further wherein the fixed object is connected to stationary electronics and the cable links the stationary electronics to electronics located on the pivot assembly; and cable strain relief means connected to the cable flex radius system.

29. The cable management system of claim 28 wherein the cable strain relief means comprises a first cable clamp located on the first curved surface and a second cable clamp located on the second opposing curved surface, wherein the first cable clamp also secures the cable to the first curved surface and the second cable clamp also secures the cable to the opposing second curved surface.

* * * * *